C. BLEAKLEY.
CAR-TRUCK.

No. 184,823. Patented Nov. 28, 1876.

WITNESSES
INVENTOR,
Christopher Bleakley,
ATTORNEY

UNITED STATES PATENT OFFICE.

CHRISTOPHER BLEAKLEY, OF DAWSON'S STATION, PENNSYLVANIA.

IMPROVEMENT IN CAR-TRUCKS.

Specification forming part of Letters Patent No. 184,823, dated November 28, 1876; application filed October 23, 1876.

*To all whom it may concern:*

Be it known that I, CHRISTOPHER BLEAKLEY, of Dawson's Station, in the county of Fayette and State of Pennsylvania, have invented an Improved Car-Truck; and I do hereby declare that the following is a full and exact description thereof, reference being had to the accompanying drawings, making part of this specification—

Figure 1:
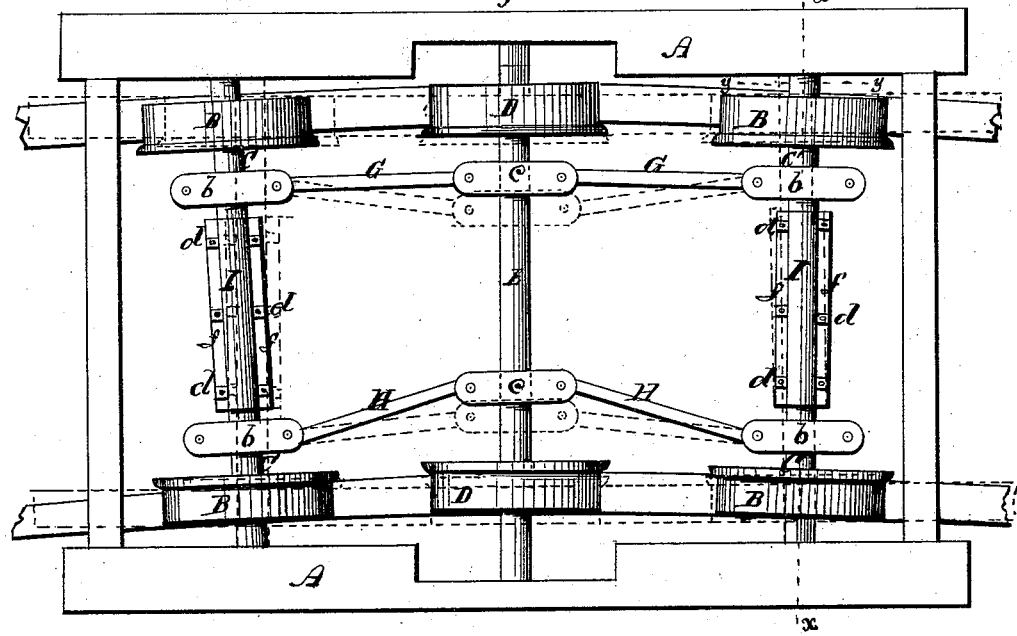
Figure 2:
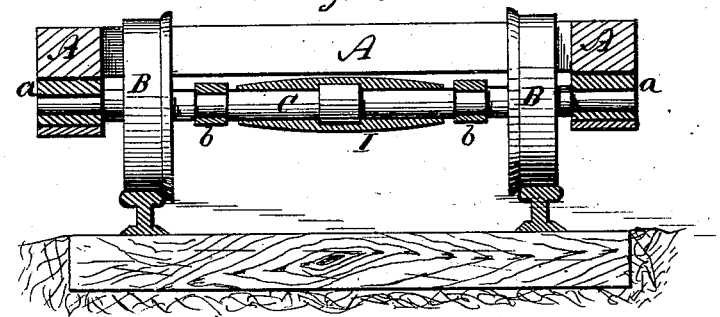
Figure 3:

Figure 1 being a top view of so much of a car-truck provided with my improvements as is necessary to show the nature of the invention; Fig. 2, a transverse vertical section of the same in a plane indicated by the line $x\ x$, Fig. 1; Fig. 3, a view of a part in detail, taken in a plane indicated by the line $y\ y$, Fig. 1.

Like letters designate corresponding parts in all of the figures.

In the drawings, A represents the truck-frame; B B and B B, two pairs of car-wheels, composing the main support of the truck; and C C, their axles.

The nature of my invention consists in combining with the two pairs of wheels B B and B B another pair of car-wheels, D D, mounted upon an axle, E, which has a limited longitudinal sliding movement in the truck, while the axles C C have a limited lateral sliding movement by their bearings in the truck, and the axle E being connected with the axles C C by two pairs of toggle-arms, G G and H H, of such lengths and so connected with the respective axles that, when the car is on a straight track, the toggle-arms will be equally bent from a straight line, guided by the flanges of the wheels D D on the track, and thereby will hold the axles C C parallel, and when the truck is on a curved track the outer pair of toggle-arms will be nearer in a straight line than the inner, by the flanges of the wheels D D on the track drawing their axle E endwise in its bearings, and thereby will throw the axles C C at the end next to the outer rail of the curved track farther apart than at the other end, so as to cause the said axles to be in line with the radii of the track-curve where they are for the moment located, and therefore remove the tendency to throw the truck from the track, all substantially as hereinafter set forth.

The longitudinal movement of the middle axle E in its bearings is to be sufficient to adapt the device to the shortest curve on the railroad whereon it is used, and the length of the horizontally-oblong movement of the bearings $a\ a$ of the axles C C, as seen in Fig. 3, is sufficient to allow the axles to assume radial positions on the said shortest curves of the railroad-track. The toggle-arms G G and H H are pivoted to sleeves $b\ b\ b\ b$ on the axles C C, and to similar sleeves $c\ c$ on the axle E. The sleeves allow the axles to turn freely in them, but have no sliding movement lengthwise on the axles, and their positions are properly equidistant from the wheels on their respective axles. The sleeves $c\ c$ on the middle axle E are somewhat closer together than the sleeves on the axles C C, so that when the truck is on a straight track the toggle-arms will not be in straight lines, but the two pairs will be equally bent from a straight line, as shown by dotted lines in Fig. 1, thus holding all the axles in parallel positions, as required; but when the truck goes upon a curved track, as indicated by full lines in Fig. 1, the outer toggle-arms G G will be more nearly in a straight line, and the inner toggle-arms H H will be farther from a straight line, thereby throwing the axles C C into radial positions in relation to the curve of the track. The effect of this action of the middle wheels D D is greater within certain limits, as the radii of the track-curve diminish, and vice versa, just as required, the toggle-arms being arranged by calculation to adapt themselves to the curves on the railroad, though no great exactness is required.

I also provide, in connection with the improvement above described, for dividing the car-axles C C by using long coupling-sleeves I I, applied in halves around the axles and united by bolts $d\ d$, passing through flanges $f\ f$ on the edges of the sleeve parts. They thus allow the outer wheels on the curved track to turn somewhat more rapidly than the wheels on the inner rail of the track, in obedience to the greater length of the outer rail of the track on which the truck runs.

What I claim as my invention, and desire to secure by Letters Patent, is—

1. The combination, with the axles C C, having a lateral movement at their bearings, and the intermediate axle E, having a longitudinal movement at its bearings, of the toggle-arms G G and H H, connecting the said axles in such a manner as to keep the said axles in radial positions on the curves of the railway-track by being themselves moved into positions more or less approximating to straight lines, substantially as and for the purpose herein specified.

2. The divided axles C C, coupled by sleeves I I, and having a lateral movement at their bearings, in combination with the axle E, having a longitudinal movement in its bearings, and connected with the said divided axles by toggle-arms G G and H H, substantially as and for the purpose herein specified.

Specification signed by me this 28th day of July, 1876.

CHRISTOPHER BLEAKLEY.

Witnesses:
J. S. SHERBONDY,
J. S. BROWN.